United States Patent
Pawar

(10) Patent No.: US 9,047,296 B2
(45) Date of Patent: *Jun. 2, 2015

(54) ASYNCHRONOUS METHODS OF DATA CLASSIFICATION USING CHANGE JOURNALS AND OTHER DATA STRUCTURES

(71) Applicant: CommVault Systems, Inc., Oceanport, NJ (US)

(72) Inventor: Rahul S. Pawar, Marlboro, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 115 days.

This patent is subject to a terminal disclaimer.

(21) Appl. No.: 13/894,010

(22) Filed: May 14, 2013

(65) Prior Publication Data

US 2013/0246485 A1    Sep. 19, 2013

Related U.S. Application Data

(63) Continuation of application No. 12/978,050, filed on Dec. 23, 2010, now Pat. No. 8,442,983.

(60) Provisional application No. 61/291,813, filed on Dec. 31, 2009.

(51) Int. Cl.
G06F 7/00 (2006.01)
G06F 17/30 (2006.01)

(52) U.S. Cl.
CPC .... G06F 17/30091 (2013.01); G06F 17/30997 (2013.01)

(58) Field of Classification Search
None
See application file for complete search history.

(56) References Cited

U.S. PATENT DOCUMENTS

| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |

(Continued)

FOREIGN PATENT DOCUMENTS

| EP | 0259912 A1 | 3/1988 |
| EP | 0405926 A2 | 1/1991 |

(Continued)

OTHER PUBLICATIONS

U.S. Appl. No. 13/759,283, filed Feb. 5, 2013, Ahn et al.

(Continued)

*Primary Examiner* — Uyen Le
(74) *Attorney, Agent, or Firm* — Perkins Coie LLP

(57) ABSTRACT

Aspects of the present invention are generally concerned with systems and methods for generating a database of metadata that describes system data and storage operations. The database of metadata may be referred to herein as a "metabase." For example, to generate a metabase, a data agent may traverse a file system to obtain certain characteristics of data managed by the file system while substantially simultaneously detecting and recording change notifications. These actions may be performed even if the actions of the data agent are interrupted one or more times during the traversal of the file system. The data agent may process the characteristics and change notifications to generate and update a metabase. Once formed, the metabase may be consulted to determine changes in system data rather than determining the changes by scanning the data files themselves.

15 Claims, 5 Drawing Sheets

(56) References Cited

U.S. PATENT DOCUMENTS

| | | |
|---|---|---|
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,519,865 A | 5/1996 | Kondo et al. |
| 5,544,345 A | 8/1996 | Carpenter et al. |
| 5,544,347 A | 8/1996 | Yanai et al. |
| 5,559,957 A | 9/1996 | Balk |
| 5,590,318 A | 12/1996 | Zbikowski et al. |
| 5,619,644 A | 4/1997 | Crockett et al. |
| 5,623,679 A | 4/1997 | Rivette et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,832,510 A | 11/1998 | Ito et al. |
| 5,875,478 A | 2/1999 | Blumenau |
| 5,887,134 A | 3/1999 | Ebrahim |
| 5,892,917 A | 4/1999 | Myerson |
| 5,901,327 A | 5/1999 | Ofek |
| 5,907,621 A | 5/1999 | Bachman et al. |
| 5,918,232 A | 6/1999 | Pouschine et al. |
| 5,924,102 A | 7/1999 | Perks |
| 5,950,205 A | 9/1999 | Aviani, Jr. |
| 5,953,721 A | 9/1999 | Doi et al. |
| 5,974,563 A | 10/1999 | Beeler, Jr. |
| 6,006,225 A | 12/1999 | Bowman et al. |
| 6,021,415 A | 2/2000 | Cannon et al. |
| 6,023,710 A | 2/2000 | Steiner et al. |
| 6,026,414 A | 2/2000 | Anglin |
| 6,052,735 A | 4/2000 | Ulrich et al. |
| 6,061,692 A | 5/2000 | Thomas et al. |
| 6,076,148 A | 6/2000 | Kedem |
| 6,088,697 A | 7/2000 | Crockett et al. |
| 6,092,062 A | 7/2000 | Lohman et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,683 B1 | 7/2002 | Lamburt |
| 6,421,711 B1 | 7/2002 | Blumenau et al. |
| 6,421,779 B1 | 7/2002 | Kuroda et al. |
| 6,430,575 B1 | 8/2002 | Dourish et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,499,026 B1 | 12/2002 | Rivette et al. |
| 6,507,852 B1 | 1/2003 | Dempsey et al. |
| 6,516,314 B1 | 2/2003 | Birkler et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,625,623 B1 | 9/2003 | Midgley et al. |
| 6,647,396 B2 | 11/2003 | Parnell et al. |
| 6,658,436 B2 | 12/2003 | Oshinsky et al. |
| 6,658,526 B2 | 12/2003 | Nguyen et al. |
| 6,732,124 B1 | 5/2004 | Koseki et al. |
| 6,763,351 B1 | 7/2004 | Subramaniam et al. |
| 6,772,164 B2 | 8/2004 | Reinhardt |
| 6,775,790 B2 | 8/2004 | Reuter et al. |
| 6,785,864 B1 | 8/2004 | Te et al. |
| 6,834,329 B2 | 12/2004 | Sasaki et al. |
| 6,836,779 B2 | 12/2004 | Poulin |
| 6,847,984 B1 | 1/2005 | Midgley et al. |
| 6,857,053 B2 | 2/2005 | Smith et al. |
| 6,871,163 B2 | 3/2005 | Hiller et al. |
| 6,886,020 B1 | 4/2005 | Zahavi et al. |
| 6,983,322 B1 | 1/2006 | Tripp et al. |
| 6,996,616 B1 | 2/2006 | Leighton et al. |
| 7,003,519 B1 | 2/2006 | Biettron et al. |
| 7,013,863 B2 | 3/2006 | Shiraishi et al. |
| 7,035,880 B1 | 4/2006 | Crescenti et al. |
| 7,047,236 B2 | 5/2006 | Conroy et al. |
| 7,085,787 B2 | 8/2006 | Beier et al. |
| 7,103,740 B1 | 9/2006 | Colgrove et al. |
| 7,104,246 B1 | 9/2006 | Gagliano et al. |
| 7,130,860 B2 | 10/2006 | Pachet et al. |
| 7,130,970 B2 | 10/2006 | Devassy et al. |
| 7,149,750 B2 | 12/2006 | Chadwick |
| 7,165,082 B1 | 1/2007 | DeVos |
| 7,167,895 B1 | 1/2007 | Connelly |
| 7,171,619 B1 | 1/2007 | Bianco |
| 7,181,444 B2 | 2/2007 | Porter et al. |
| 7,194,454 B2 | 3/2007 | Hansen et al. |
| 7,197,502 B2 | 3/2007 | Feinsmith |
| 7,200,726 B1 | 4/2007 | Gole et al. |
| 7,240,100 B1 | 7/2007 | Wein et al. |
| 7,246,207 B2 | 7/2007 | Kottomtharayil et al. |
| 7,246,211 B1 | 7/2007 | Beloussov et al. |
| 7,269,612 B2 | 9/2007 | Devarakonda et al. |
| 7,272,606 B2 | 9/2007 | Borthakur et al. |
| 7,330,997 B1 | 2/2008 | Odom |
| 7,343,365 B2 | 3/2008 | Farnham et al. |
| 7,346,623 B2 | 3/2008 | Prahlad et al. |
| 7,346,676 B2 | 3/2008 | Swildens et al. |
| 7,356,657 B2 | 4/2008 | Mikami |
| 7,356,660 B2 | 4/2008 | Matsunami et al. |
| 7,359,917 B2 | 4/2008 | Winter et al. |
| 7,366,859 B2 | 4/2008 | Per et al. |
| 7,386,663 B2 | 6/2008 | Cousins |
| 7,395,282 B1 | 7/2008 | Crescenti et al. |
| 7,430,587 B2 | 9/2008 | Malone et al. |
| 7,433,301 B2 | 10/2008 | Akahane et al. |
| 7,440,966 B2 | 10/2008 | Adkins et al. |
| 7,440,984 B2 | 10/2008 | Augenstein et al. |
| 7,454,569 B2 | 11/2008 | Kavuri et al. |
| 7,496,589 B1 | 2/2009 | Jain et al. |

(56) References Cited

U.S. PATENT DOCUMENTS

| | | |
|---|---|---|
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,512,814 B2 | 3/2009 | Chen et al. |
| 7,529,748 B2 | 5/2009 | Wen et al. |
| 7,532,340 B2 | 5/2009 | Koppich et al. |
| 7,533,103 B2 | 5/2009 | Brendle et al. |
| 7,533,181 B2 | 5/2009 | Dawson et al. |
| 7,533,230 B2 | 5/2009 | Glover et al. |
| 7,583,861 B2 | 9/2009 | Hanna et al. |
| 7,584,227 B2 | 9/2009 | Gokhale et al. |
| 7,590,997 B2 | 9/2009 | Diaz Perez |
| 7,613,728 B2 | 11/2009 | Png et al. |
| 7,613,752 B2 | 11/2009 | Prahlad et al. |
| 7,617,541 B2 | 11/2009 | Plotkin et al. |
| 7,620,710 B2 | 11/2009 | Kottomtharayil et al. |
| 7,624,443 B2 | 11/2009 | Kramer et al. |
| 7,627,598 B1 | 12/2009 | Burke |
| 7,627,617 B2 | 12/2009 | Kavuri et al. |
| 7,631,151 B2 | 12/2009 | Prahlad et al. |
| 7,634,478 B2 | 12/2009 | Yang et al. |
| 7,657,550 B2 | 2/2010 | Prahlad et al. |
| 7,660,800 B2 | 2/2010 | Prahlad et al. |
| 7,660,807 B2 | 2/2010 | Prahlad et al. |
| 7,668,798 B2 | 2/2010 | Scanlon et al. |
| 7,668,884 B2 | 2/2010 | Prahlad et al. |
| 7,672,962 B2 | 3/2010 | Arrouye et al. |
| 7,693,856 B2 | 4/2010 | Arrouye et al. |
| 7,707,178 B2 | 4/2010 | Prahlad et al. |
| 7,711,700 B2 | 5/2010 | Prahlad et al. |
| 7,716,171 B2 | 5/2010 | Kryger |
| 7,716,191 B2 | 5/2010 | Blumenau et al. |
| 7,720,801 B2 | 5/2010 | Chen |
| 7,725,605 B2 | 5/2010 | Palmeri et al. |
| 7,725,671 B2 | 5/2010 | Prahlad et al. |
| 7,734,593 B2 | 6/2010 | Prahlad et al. |
| 7,734,669 B2 | 6/2010 | Kottomtharayil et al. |
| 7,734,715 B2 | 6/2010 | Hyakutake et al. |
| 7,747,579 B2 | 6/2010 | Prahlad et al. |
| 7,756,837 B2 | 7/2010 | Williams et al. |
| 7,801,864 B2 | 9/2010 | Prahlad et al. |
| 7,818,215 B2 | 10/2010 | King et al. |
| 7,822,749 B2 | 10/2010 | Prahlad et al. |
| 7,831,553 B2 | 11/2010 | Prahlad et al. |
| 7,831,622 B2 | 11/2010 | Prahlad et al. |
| 7,831,795 B2 | 11/2010 | Prahlad et al. |
| 7,840,537 B2 | 11/2010 | Gokhale et al. |
| 7,840,619 B2 | 11/2010 | Horn |
| 7,841,011 B2 | 11/2010 | Manson et al. |
| 7,849,059 B2 | 12/2010 | Prahlad et al. |
| 7,882,077 B2 | 2/2011 | Gokhale et al. |
| 7,882,098 B2 | 2/2011 | Prahlad et al. |
| 7,890,467 B2 | 2/2011 | Watanabe et al. |
| 7,890,469 B1 | 2/2011 | Maionchi et al. |
| 7,925,856 B1 | 4/2011 | Greene |
| 7,933,920 B2 | 4/2011 | Kojima et al. |
| 7,937,365 B2 | 5/2011 | Prahlad et al. |
| 7,937,393 B2 | 5/2011 | Prahlad et al. |
| 7,962,709 B2 | 6/2011 | Agrawal |
| 7,966,495 B2 | 6/2011 | Ackerman et al. |
| 8,010,769 B2 | 8/2011 | Prahlad et al. |
| 8,037,031 B2 | 10/2011 | Gokhale et al. |
| 8,041,677 B2 | 10/2011 | Sumner et al. |
| 8,051,045 B2 | 11/2011 | Vogler |
| 8,051,095 B2 | 11/2011 | Prahlad et al. |
| 8,055,650 B2 | 11/2011 | Scanlon et al. |
| 8,055,745 B2 | 11/2011 | Atluri |
| 8,086,569 B2 | 12/2011 | Jasrasaria |
| 8,117,196 B2 | 2/2012 | Jones et al. |
| 8,140,786 B2 | 3/2012 | Bunte et al. |
| 8,170,995 B2 | 5/2012 | Prahlad et al. |
| 8,190,571 B2 | 5/2012 | Sen et al. |
| 8,219,524 B2 | 7/2012 | Gokhale |
| 8,229,954 B2 | 7/2012 | Kottomtharayil et al. |
| 8,234,249 B2 | 7/2012 | Prahlad et al. |
| 8,271,548 B2 | 9/2012 | Prahlad et al. |
| 8,285,964 B2 | 10/2012 | Prahlad et al. |
| 8,401,996 B2 | 3/2013 | Muller et al. |
| 8,442,983 B2 | 5/2013 | Pawar |
| 2001/0047365 A1 | 11/2001 | Yonaitis |
| 2002/0049626 A1 | 4/2002 | Mathias et al. |
| 2002/0069324 A1 | 6/2002 | Gerasimov et al. |
| 2002/0087550 A1 | 7/2002 | Carlyle et al. |
| 2002/0147734 A1 | 10/2002 | Shoup et al. |
| 2002/0161753 A1 | 10/2002 | Inaba et al. |
| 2003/0018607 A1 | 1/2003 | Lennon et al. |
| 2003/0046313 A1 | 3/2003 | Leung et al. |
| 2003/0101183 A1 | 5/2003 | Kabra et al. |
| 2003/0130993 A1 | 7/2003 | Mendelevitch et al. |
| 2003/0182583 A1 | 9/2003 | Turco |
| 2003/0196052 A1 | 10/2003 | Bolik et al. |
| 2004/0015514 A1 | 1/2004 | Melton et al. |
| 2004/0254919 A1 | 12/2004 | Giuseppini |
| 2004/0260678 A1 | 12/2004 | Verbowski et al. |
| 2004/0260973 A1 | 12/2004 | Michelman |
| 2005/0010588 A1 | 1/2005 | Zalewski et al. |
| 2005/0050075 A1 | 3/2005 | Okamoto et al. |
| 2005/0055352 A1 | 3/2005 | White et al. |
| 2005/0055386 A1 | 3/2005 | Tosey |
| 2005/0086231 A1 | 4/2005 | Moore |
| 2005/0114381 A1 | 5/2005 | Borthakur et al. |
| 2005/0154695 A1 | 7/2005 | Gonzalez et al. |
| 2005/0187937 A1 | 8/2005 | Kawabe et al. |
| 2005/0188248 A1 | 8/2005 | O'Brien et al. |
| 2005/0216453 A1 | 9/2005 | Sasaki et al. |
| 2005/0228794 A1 | 10/2005 | Navas et al. |
| 2005/0262097 A1 | 11/2005 | Sim-Tang et al. |
| 2006/0004820 A1 | 1/2006 | Claudatos et al. |
| 2006/0015524 A1 | 1/2006 | Gardiner et al. |
| 2006/0224846 A1 | 10/2006 | Amarendran et al. |
| 2006/0259468 A1 | 11/2006 | Brooks et al. |
| 2006/0259527 A1 | 11/2006 | Devarakonda et al. |
| 2006/0277154 A1 | 12/2006 | Lunt et al. |
| 2007/0033191 A1 | 2/2007 | Hornkvist et al. |
| 2007/0043956 A1 | 2/2007 | El Far et al. |
| 2007/0067304 A1 | 3/2007 | Ives |
| 2007/0100867 A1 | 5/2007 | Celik et al. |
| 2007/0185926 A1 | 8/2007 | Prahlad et al. |
| 2007/0203938 A1 | 8/2007 | Prahlad et al. |
| 2007/0282680 A1 | 12/2007 | Davis et al. |
| 2008/0059495 A1 | 3/2008 | Kiessig et al. |
| 2008/0059515 A1 | 3/2008 | Fulton |
| 2008/0077594 A1 | 3/2008 | Ota |
| 2008/0091747 A1 | 4/2008 | Prahlad et al. |
| 2008/0183662 A1 | 7/2008 | Reed et al. |
| 2008/0228771 A1 | 9/2008 | Prahlad et al. |
| 2009/0172333 A1 | 7/2009 | Marcu et al. |
| 2009/0287665 A1 | 11/2009 | Prahlad et al. |
| 2009/0319534 A1 | 12/2009 | Gokhale |
| 2010/0057870 A1 | 3/2010 | Ahn et al. |
| 2010/0082672 A1 | 4/2010 | Kottomtharayil et al. |
| 2010/0179941 A1 | 7/2010 | Agrawal et al. |
| 2010/0205150 A1 | 8/2010 | Prahlad et al. |
| 2010/0299490 A1 | 11/2010 | Attarde et al. |
| 2011/0178986 A1 | 7/2011 | Prahlad et al. |
| 2011/0181383 A1 | 7/2011 | Lotfi et al. |
| 2012/0215745 A1 | 8/2012 | Prahlad et al. |
| 2012/0254115 A1 | 10/2012 | Varadharajan |
| 2012/0271832 A1 | 10/2012 | Prahlad et al. |
| 2013/0013609 A1 | 1/2013 | Prahlad et al. |
| 2013/0110790 A1 | 5/2013 | Matsumoto et al. |
| 2013/0198221 A1 | 8/2013 | Roark et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| EP | 1174795 | 1/2002 |
| WO | WO-9412944 A1 | 6/1994 |
| WO | WO-9513580 A1 | 5/1995 |
| WO | WO-9912098 A1 | 3/1999 |

(56) References Cited

FOREIGN PATENT DOCUMENTS

| WO | WO-9914692 A1 | 3/1999 |
|---|---|---|
| WO | WO-0106368 A1 | 1/2001 |
| WO | WO-0193537 A2 | 12/2001 |
| WO | WO-03060774 A1 | 7/2003 |
| WO | WO-2004010375 A3 | 6/2004 |
| WO | WO-2004063863 A3 | 3/2005 |
| WO | WO-2005055093 A2 | 6/2005 |
| WO | WO-2007062254 A2 | 5/2007 |
| WO | WO-2007062429 A2 | 5/2007 |
| WO | WO-2008049023 A2 | 4/2008 |

OTHER PUBLICATIONS

"Text Figures", retrieved from http://www.microsoft.com/msj/1198.ntfs/ntfstextfigs.htm on Nov. 10, 2005, 7 pages.

"Titus Labs—Announces Document Classification for Microsoft Word" Nov. 3, 2005, XP55034835, available at http://web.archive.org/web/20051126093136/http://www.titus-labs.com/about/DocClassRelease.html, 1 page.

Armstead et al., "Implementation of a Campus-wide Distributed Mass Storage Service: The Dream vs. Reality," IEEE, 1995, pp. 190-199.

Arneson, "Mass Storage Archiving in Network Environments," Digest of Papers, Ninth IEEE Symposium on Mass Storage Systems, Oct. 31, 1888-Nov. 3, 1988, pp. 45-50, Monterey, CA.

Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.

Bowman et al. "Harvest: A Scalable, Customizable Discovery and Access System," Department of Computer Science, University of Colorado—Boulder, Revised Mar. 1995, 29 pages.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

EMC Corporation, "Today's Choices for Business Continuity," 2004, 12 pages.

Extended European Search Report for European Application No. EP11003795, Mail Date Nov. 21, 2012, 20 pages.

Farley, M., "Storage Network Fundamentals,, Network Backup: The Foundation of Storage Management, Data Management," Storage Networking Fundamentals: an Introduction to Storage Devices, Subsystems, Applications, Management, and Filing [File] Systems, Cisco Press, Jan. 1, 2005, 9 pages.

Gait, J., "The Optical File Cabinet: A Random-Access File System for Write-Once Optical Disks," IEEE Computer, vol. 21, No. 6, pp. 11-22 (1988).

Harrison, CDIA Training & Test Preparation Guide 2000, Specialized Solutions, 3 pages.

International Search Report and Written Opinion for International Application No. PCT/US07/81681, Mail Date Nov. 13, 2009, 8 pages.

International Search Report and Written Opinion for International Application No. PCT/US10/62069, Mail Date Mar. 7, 2011, 7 pages.

Jander, M., "Launching Storage-Area Net," Data Communications, US, McGraw Hill, NY, vol. 27, No. 4 (Mar. 21, 1998), pp. 64-72.

Jeffrey Cooperstein and Jeffrey Richter, "Keeping an Eye on Your NTFS Drives, Part II: Building a Change Journal Application," Microsoft Systems Journal, Oct. 1999, 14 pages.

Jeffrey Cooperstein and Jeffrey Richter, "Keeping an Eye on Your NTFS Drives: the Windows 2000 Change Journal Explained," Microsoft Systems Journal, Sep. 1999, 17 pages.

Jeffrey Richter and Luis Felipe Cabrera, "A File System for the 21st Century: Previewing the Windows NT 5.0 File System," and attached text figures, Microsoft Systems Journal, Nov. 1998, 24 pages.

Karl Langdon and John Merryman, "Data Classification: Getting Started," Storage Magazine, Jul. 2005, 3 pages.

Manber et al., "WebGlimpse—Combining Browsing and Searching," 1997 Usenix Technical Conference, Jan. 1997, 12 pages.

Microsoft Developer Network, "GetFileAttributes," online library article, [accessed on Nov. 10, 2005], 3 pages.

Microsoft Developer Network, "GetFileAttributesEx," online library article, [accessed on Nov. 10, 2005], 2 pages.

Microsoft Developer Network, "Win32_File_Attribute_Data," online library article, [accessed on Nov. 10, 2005], 3 pages.

O'Neill, B.,"New Tools to Classify Data," Storage Magazine, Aug. 2005, 4 pages.

Partial International Search Results, mailed May 25, 2007, International Application No. PCT/US2006/045556, 2 pages.

PCT International Search Report and Written Opinion for International Application No. PCT/US07/81681, Mail Date Oct. 20, 2008, 11 pages.

Quick Reference Guide for West and EAST [date unknown, but verified as of Sep. 13, 2007], Search and Information Resource Administration, 2 pages.

Rosenblum et al., "The Design and Implementation of a Log-Structured File System," Operating Systems Review SIGOPS, vol. 25, No. 5, New York, US, pp. 1-15 (May 1991).

Titus Labs Document Classification V1.1 for Microsoft Word—Document Policy Enforcement, avaliable at: <http://web.archive.org/web/20060104112621/www.titus-labs.com/includes/PDF/DocClassDataSheet.pdf>, Nov. 3, 2005, 2 pages.

User's Manual for the Examiners Automated Search Tool (EAST) Jul. 22, 1999, Version 1.0, 179 pages.

ASYNCHRONOUS METHODS OF DATA CLASSIFICATION USING CHANGE JOURNALS AND OTHER DATA STRUCTURES

CROSS-REFERENCE TO RELATED APPLICATIONS

This application is a continuation of U.S. patent application Ser. No. 12/978,050, filed Dec. 23, 2010, entitled ASYNCHRONOUS METHODS OF DATA CLASSIFICATION USING CHANGE JOURNALS AND OTHER DATA STRUCTURES, now U.S. Pat. No. 8,442,983, which claims the benefit of U.S. Patent Application No. 61/291,813, filed Dec. 31, 2009, entitled ASYNCHRONOUS METHODS OF DATA CLASSIFICATION USING CHANGE JOURNALS AND OTHER DATA STRUCTURES, each of which is hereby incorporated herein by reference in its entirety.

BACKGROUND

Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

Storage systems may scan the file system of a client or other computing device for various reasons, such as to determine which data objects on the client should be associated with a particular storage operation. For example, this determining may involve collecting metadata by scanning or traversing the file system of the client prior to performing storage operations. The scanning process is typically time-consuming and uses significant client resources that might be more desirably spent performing other tasks associated with production applications. Thus it is desirable to limit the frequency of file system scans. To reduce the number of file system scans, a system may update the metadata obtained from a scan using other information generated and cached by a change journal process during and after a scan. However if a volume on a client's file system is large and/or a file system experiences a high rate of changes to files, the information cached by a change journal process alone may be insufficient to update the metadata to reflect all system changes that occurred during a scan. The scanning process may also need to be restarted anew if the scan is paused for any reason before its completion.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

The headings provided herein are for convenience only and do not necessarily affect the scope or meaning of the claimed invention.

Overview

Aspects of the present invention are generally concerned with systems and methods for generating a database of metadata that describes system data and storage operations. The database of metadata may be referred to herein as a "metabase." For example, to generate a metabase, a data agent may traverse a file system to obtain certain characteristics of data managed by the file system while substantially simultaneously detecting and recording change notifications. These actions may be performed even if the actions of the data agent are interrupted one or more times during the traversal of the file system. The data agent may process the characteristics and change notifications to generate and update a metabase. Once formed, the metabase may be consulted to determine changes in system data rather than determining the changes by scanning the data files themselves.

With this arrangement, if it is desired to obtain information regarding data, a system administrator or system process may simply consult the metabase for such information rather than iteratively accessing and analyzing each data object in the system. Thus, this significantly reduces the amount of time required to obtain data object information by substantially eliminating the need to obtain information from the source data, and furthermore minimizes the involvement of network resources in this process, substantially reducing the processing burden on the host system.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
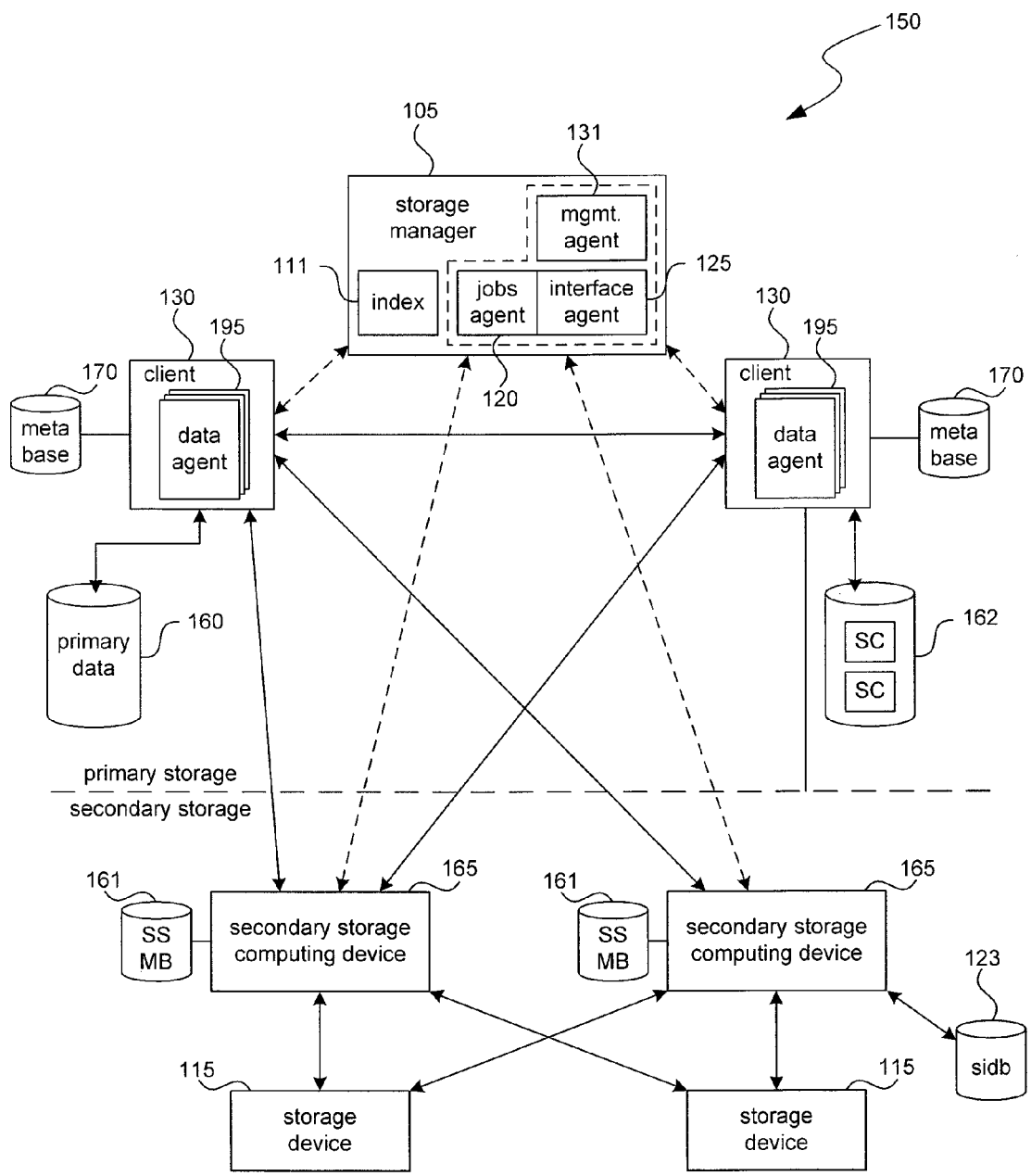
FIG. 1 is a block diagram illustrating an example of a data storage system that may employ aspects of the invention
Figure 2:
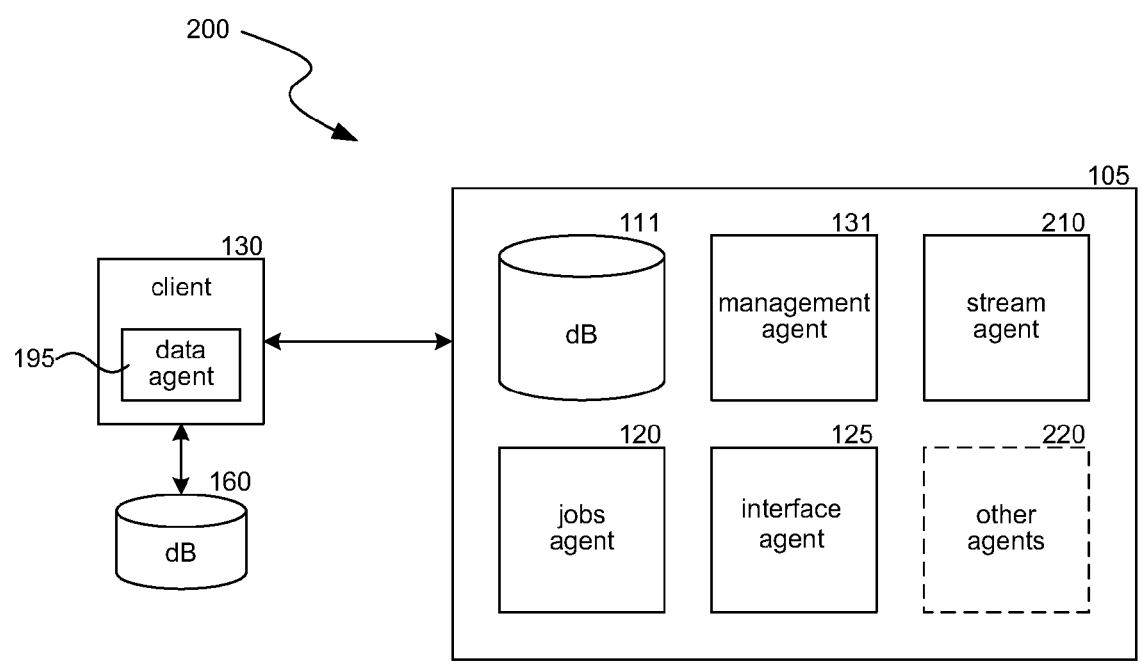
FIG. 2 is a block diagram illustrating in more detail certain components of a data storage system according to some examples.

FIGS. 1 and 2 and the discussion herein provide a brief, general description of suitable specialized environments in which aspects of the invention can be implemented. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular phones, mobile phones, and/or mobile devices, multi-processor systems, microprocessor-based or programmable consumer electronics, set-top boxes, network PCs, mini-computers, mainframe computers, and the like. The terms "computer," "server," "host," "host system," and the like are generally used interchangeably herein, and refer to any of the above devices and systems, as well as any data processor.

While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), and/or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Figure 3:
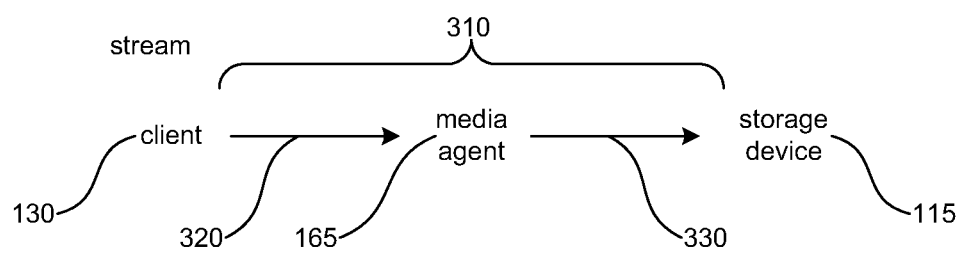
FIG. 3 illustrates components of a data stream that may be utilized by a data storage system.
Figure 4:
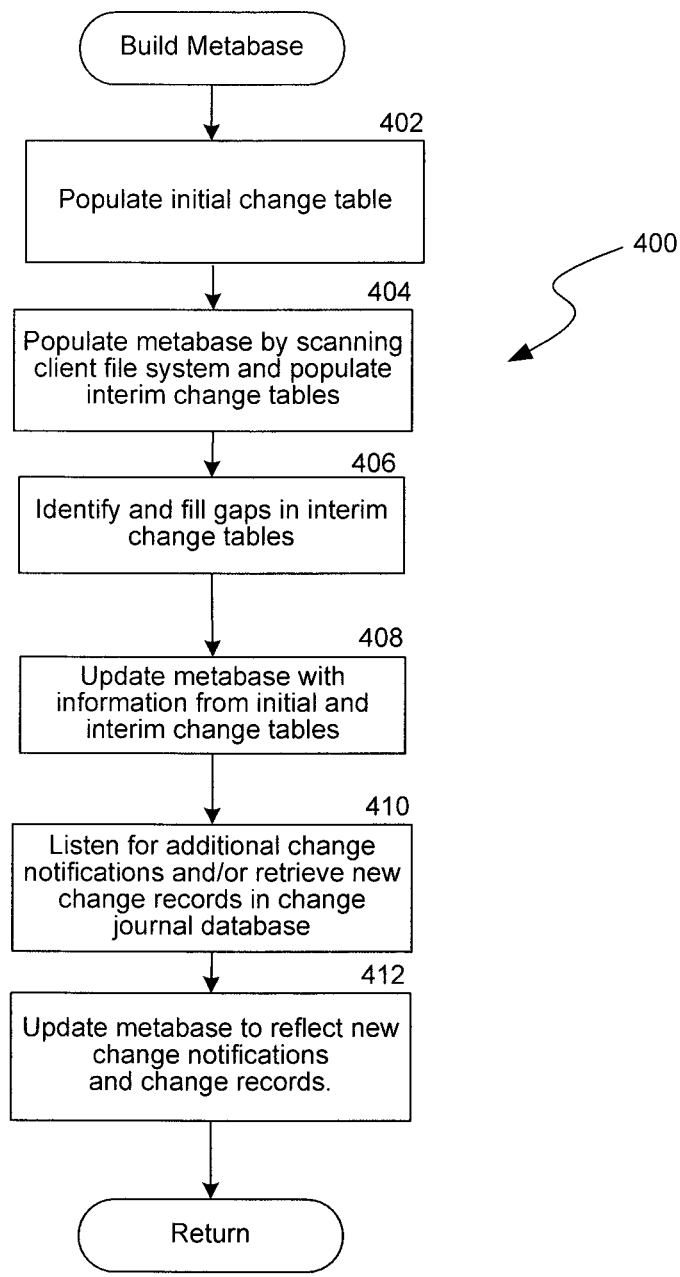
FIG. 4 is a flow diagram illustrating a process for building a metabase.
Figure 5:
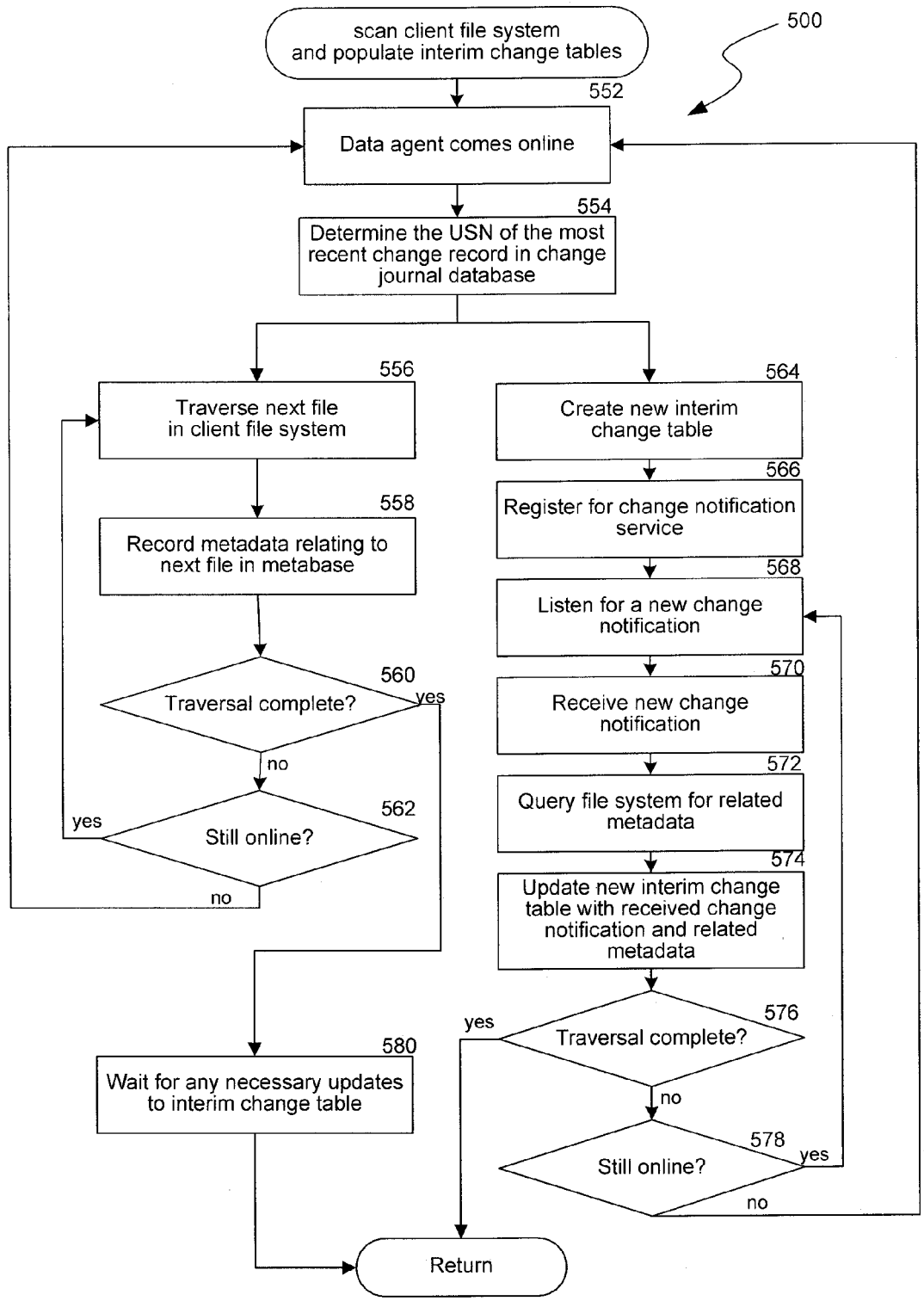
FIG. 5 is a flow diagram illustrating a process for scanning a client file system and populating interim change tables in a substantially simultaneous fashion.

Aspects of the invention will now be described in detail with respect to FIGS. 1 through 5. FIGS. 1-3 illustrate various components of a data storage system that may employ aspects of the invention. FIG. 4 is a flow diagram illustrating a process for building a metabase. FIG. 5 is a flow diagram illustrating a process for scanning a client file system and populating interim change tables in a substantially simultaneous fashion.
Suitable Data Storage System FIG. 1 illustrates an example of one arrangement of resources in a computing network, comprising a data storage system 150. The resources in the data storage system 150 may employ the processes and techniques described herein. The system 150 includes a storage manager 105, one or more data agents 195, one or more secondary storage computing devices 165, one or more storage devices 115, one or more computing devices 130 (called clients 130), one or more data or information stores 160 and 162, and a single instancing database 123. The storage manager 105 includes an index 111, a jobs agent 120, an interface agent 125, and a management agent 131. The system 150 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 150 may also represent a modular storage system such as the CommVault Simpana system, also available from CommVault Systems, Inc.

The system 150 may generally include combinations of hardware and software components associated with performing storage operations on electronic data. Storage operations include copying, backing up, creating, storing, retrieving, and/or migrating primary storage data (e.g., data stores 160 and/or 162) and secondary storage data (which may include, for example, snapshot copies, backup copies, hierarchical storage management (HSM) copies, archive copies, and other types of copies of electronic data stored on storage devices 115). The system 150 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 115, retained for a specified period of time before being aged to another tier of secondary storage, copied to the storage device 115 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. A "retention policy" may specify how long data is to be retained at specific tiers of storage or what criteria must be met before data may be pruned or moved from one tier of storage to another tier of storage. In some cases, the storage policy includes information generally specified by the schedule policy and/or the retention policy. (Put another way, the storage policy includes the schedule policy and/or the retention policy.) Storage policies, schedule policies and/or retention policies may be stored in a database of the storage manager 105, to archive media as metadata for use in restore operations or other storage operations, or to other locations or components of the system 150.

The system 150 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 105 (or management agent 131), a secondary storage computing device 165, a client 130, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 165, client 130, or other network device connected to a primary storage volume, while a storage operation cell configured to perform HSM tasks may instead include a secondary storage computing device 165, client 130, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 105 that coordinates storage operations via the same secondary storage computing devices 165 and storage devices 115. This "overlapping" configuration allows storage resources to be accessed by more than one storage manager 105, such that multiple paths exist to each storage device 115 facilitating failover, load balancing, and promoting robust data access via alternative routes.

Alternatively or additionally, the same storage manager 105 may control two or more storage operation cells (whether or not each storage operation cell has its own dedicated storage manager 105). Moreover, in certain embodiments, the extent or type of overlap may be user-defined (through a control console) or may be automatically configured to optimize data storage and/or retrieval.

The clients 130 typically include application software for performing various operations. Clients 130 typically also include an operating system on which the application software runs. Clients 130 may include local storage such as a media module or media drive with fixed or removable media. A file system can be provided to facilitate and control file access by the operating system and application software. File systems can facilitate access to local and remote storage devices for file or data access and storage.

File systems can also facilitate the generation of certain kinds of metadata pertaining to data objects stored on local and remote storage devices. For example, a file system may expose an Application Programming Interface ("API") that permits processes or modules within the system to determine one or more of the following for a data object accessible by the file system: a data owner (e.g., the client or user that generates the data object), a last modified time (e.g., the time of the most recent modification), the data object size (e.g., number of bytes of data), information about the data object's content (e.g., content tags), to/from information for email objects (e.g., an email sender, email recipient, or individual or group on an email distribution list), creation time (e.g., the time at which the data object was created), file type (e.g., format or application type), last accessed time (e.g., the time the data object was most recently accessed or viewed), application type (e.g., the application which generated the data object), location or path (e.g., a current, past, or future location of the data object and network pathways to/from the data object), business unit (e.g., a group or department that generates, manages, or is otherwise associated with the data object), and aging information (e.g., a schedule for migrating a data object to secondary or long term storage), etc.

A client 130 may also comprise a monitor agent that is configured to monitor and record certain data interactions within a client 130, typically on a continuous basis during the operation of the client 130. In one example, a monitor agent may include a filter driver program and may be deployed on an input/output port or data stack and operate in conjunction with a client file system to record data interactions. For example, a monitor agent may be deployed to monitor interactions between client 130 and data objects stored in data store 160. A monitor agent may maintain a change journal database that comprises a change record for each data interaction detected by the monitor agent. Each change record may include relevant properties of the data object involved in an interaction, such as a file reference number (FRN) and/or parent file reference number (PFRN). Each change record may also include one or more change codes that provide information regarding the type of data interaction detected. Each change record may further include a unique change record identifier such as an update sequence number (USN) that the monitor agent increments for each new change record created and stored in the change journal database.

In some examples, the size of the change journal database may be fixed so that the monitor agent may cache or store only a certain number of change records within the change journal database. This fixed size is referred to herein as the change journal cache size. The change journal cache size may be configurable by a user or other processes or modules running within the system. In examples where the change journal database has a fixed change journal cache size, the change journal database may operate on a first-in-first-out (FIFO) basis. Thus, at any given time, the change journal database may reflect only a fixed number of the most recent data interactions detected by the monitor agent.

The monitor agent may further provide a change notification service that permits other processes or modules within the system to subscribe to the change notification service in order to receive change notifications. A change notification reflects all or some of the content of a change record and is provided by the change notification service at approximately the same time that the change record is created by the monitor agent or shortly thereafter. For example, a change notification may include a USN, one or more change codes, and an FRN. In some implementations, upon the request of a subscriber, the change notification service may be configured to provide additional metadata information in each change notification that may not be included in the change record. For example, a change notification service may provide to a subscriber in a change notification: a USN, one or more change codes, an FRN, data object size, and last modified time.

In some implementations, a monitor agent may be provided by an operating system on the client 130 or elsewhere. Either the monitor agent itself or the operating system may expose an API to permit other system components to query a change journal database and/or subscribe to a change notification service. One example of a monitor agent is Microsoft's Change Journal. In one example, Microsoft's Change Journal also provides a change notification service. In some examples, the clients 130 include storage mechanisms for allowing computer programs or other instructions or data to be loaded into memory for execution. Such storage mechanisms might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to memory.

Data agent 195 may be a software module or part of a software module that is generally responsible for performing storage operations on the data of the client 130 stored in data store 160/162 or other memory location. Each client 130 may have at least one data agent 195 and the system 150 can support multiple clients 130. Data agent 195 may be distributed between client 130 and storage manager 105 (and any other intermediate components), or it may be deployed from a remote location or its functions approximated by a remote process that performs some or all of the functions of data agent 195. In some implementations, a data agent 195 may be responsible for generating a metabase 170 and/or metabase information stored within a secondary storage computing device index 161.

As used herein, the term module might describe a given unit of functionality that can be performed in accordance with one or more embodiments of the present invention. As used herein, a module might be implemented utilizing any form of hardware, software, firmware, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

The overall system 150 may employ multiple data agents 195, each of which may perform storage operations on data associated with a different application. For example, different individual data agents 195 may be designed to handle Microsoft Exchange data, Lotus Notes data, Microsoft Windows file system data, Microsoft Active Directory Objects data, Microsoft SQL Server data, Microsoft Sharepoint Server data, and other types of data known in the art. Other embodiments may employ one or more generic data agents 195 that can handle and process multiple data types rather than using the specialized data agents described above.

If a client 130 has two or more types of data, one data agent 195 may be required for each data type to perform storage operations on the data of the client 130. For example, to back up, migrate, and restore all the data on a Microsoft Exchange server, the client 130 may use one Microsoft Exchange Mailbox data agent 195 to back up the Exchange mailboxes, one Microsoft Exchange Database data agent 195 to back up the Exchange databases, one Microsoft Exchange Public Folder data agent 195 to back up the Exchange Public Folders, and one Microsoft Windows File System data agent 195 to back up the file system of the client 130. These data agents 195 would be treated as four separate data agents 195 by the system even though they reside on the same client 130.

Alternatively, the overall system 150 may use one or more generic data agents 195, each of which may be capable of handling two or more data types. For example, one generic data agent 195 may be used to back up, migrate and restore Microsoft Exchange Mailbox data and Microsoft Exchange Database data while another generic data agent 195 may handle Microsoft Exchange Public Folder data and Microsoft Windows File System data, etc.

Data agents 195 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 105 or secondary storage computing devices 165. As used herein, a file or a data object refers to any collection or grouping of bytes of data that can be viewed as one or more logical units.

Generally speaking, storage manager 105 may be a software module or other application that coordinates and controls storage operations performed by the system 150. Storage manager 105 may communicate with some or all elements of the system 150, including clients 130, data agents 195, secondary storage computing devices 165, and storage devices 115, to initiate and manage storage operations (e.g., backups, migrations, data recovery operations, etc.).

Storage manager 105 may include a jobs agent 120 that monitors the status of some or all storage operations previously performed, currently being performed, or scheduled to be performed by the system 150. (One or more storage operations are alternatively referred to herein as a "job" or "jobs.") Jobs agent 120 may be communicatively coupled to an interface agent 125 (e.g., a software module or application). Interface agent 125 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 125, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 115).

Storage manager 105 may also include a management agent 131 that is typically implemented as a software module or application program. In general, management agent 131 provides an interface that allows various management agents 131 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 125. This allows each storage operation cell to send and receive certain pertinent information from other storage operation cells, including status information, routing information, information regarding capacity and utilization, etc. These communications paths may also be used to convey information and instructions regarding storage operations.

For example, a management agent 131 in a first storage operation cell may communicate with a management agent 131 in a second storage operation cell regarding the status of storage operations in the second storage operation cell. Another illustrative example includes the case where a management agent 131 in a first storage operation cell communicates with a management agent 131 in a second storage operation cell to control storage manager 105 (and other components) of the second storage operation cell via management agent 131 contained in storage manager 105.

Another illustrative example is the case where management agent 131 in a first storage operation cell communicates directly with and controls the components in a second storage operation cell and bypasses the storage manager 105 in the second storage operation cell. If desired, storage operation cells can also be organized hierarchically such that hierarchically superior cells control or pass information to hierarchically subordinate cells or vice versa.

Storage manager 105 may also maintain an index, a database, or other data structure 111. The data stored in database 111 may be used to indicate logical associations between components of the system, user preferences, management tasks, media containerization and data storage information or other useful data. For example, the storage manager 105 may use data from database 111 to track logical associations between secondary storage computing device 165 and storage devices 115 (or movement of data as containerized from primary to secondary storage).

Generally speaking, the secondary storage computing device 165, which may also be referred to as a media agent, may be implemented as a software module that conveys data, as directed by storage manager 105, between a client 130 and one or more storage devices 115 such as a tape library, a magnetic media storage device, an optical media storage device, or any other suitable storage device. In one embodiment, secondary storage computing device 165 may be communicatively coupled to and control a storage device 115. A secondary storage computing device 165 may be considered to be associated with a particular storage device 115 if that secondary storage computing device 165 is capable of routing and storing data to that particular storage device 115.

In operation, a secondary storage computing device 165 associated with a particular storage device 115 may instruct the storage device to use a robotic arm or other retrieval means to load or eject a certain storage media, and to subsequently archive, migrate, or restore data to or from that media. Secondary storage computing device 165 may communicate with a storage device 115 via a suitable communications path such as a SCSI or Fibre Channel communications link. In some embodiments, the storage device 115 may be communicatively coupled to the storage manager 105 via a SAN.

Each secondary storage computing device 165 may maintain an index, a database, or other data structure 161 that may store index data generated during storage operations for secondary storage (SS) as described herein, including creating a metabase (MB). For example, performing storage operations on Microsoft Exchange data may generate index data. Such index data provides a secondary storage computing device 165 or other external device with a fast and efficient mechanism for locating data stored or backed up, since a device may simply consult the metabase for information rather than iteratively accessing and analyzing each data object stored or backed up. Thus, a secondary storage computing device index 161, or a database 111 of a storage manager 105, may store data associating a client 130 with a particular secondary storage computing device 165 or storage device 115, for example, as specified in a storage policy, while a database or other data structure in secondary storage computing device 165 may indicate where specifically the data of the client 130 is stored in storage device 115, what specific files were stored, and other information associated with storage of the data of the client 130. In some embodiments, such index data may be stored along with the data backed up in a storage device 115, with an additional copy of the index data written to index cache in a secondary storage device. Thus the data is readily available for use in storage operations and other activities without having to be first retrieved from the storage device 115.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 115. In some embodiments, the cached information may include information regarding format or containerization of archives or other files stored on storage device 115.

One or more of the secondary storage computing devices 165 may also maintain one or more single instance databases 123. Single instancing (alternatively called data deduplication) generally refers to storing in secondary storage only a single instance of each data object (or data block) in a set of data (e.g., primary data). More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS; 2) U.S. patent application Ser. No. 12/145,347 (entitled APPLICATION-AWARE AND REMOTE SINGLE INSTANCE DATA MANAGEMENT; or 3) U.S. patent application Ser. No. 12/145,342 (entitled APPLICATION-AWARE AND REMOTE SINGLE INSTANCE DATA MANAGEMENT, 4) U.S. patent application Ser. No. 11/963,623 (entitled SYSTEM AND METHOD FOR STORING REDUNDANT INFORMATION; 5) U.S. patent application Ser. No. 11/950,376 (entitled SYSTEMS AND METHODS FOR CREATING COPIES OF DATA SUCH AS ARCHIVE COPIES; 6) U.S. patent application Ser. No. 12/565,576 (entitled SYSTEMS AND METHODS FOR MANAGING SINGLE INSTANCING DATA; or 7) U.S. patent application Ser. No. 12/647,906 (entitled BLOCK-LEVEL SINGLE INSTANCING, each of which is incorporated by reference herein in its entirety.

In some examples, the secondary storage computing devices 165 maintain one or more variable instance databases. Variable instancing generally refers to storing in secondary storage one or more instances, but fewer than the total number of instances, of each data block (or data object) in a set of data (e.g., primary data). More details as to variable instancing may be found in the commonly-assigned U.S. patent application Ser. No. 12/649,454 (entitled STORING A VARIABLE NUMBER OF INSTANCES OF DATA OBJECTS.

In some embodiments, certain components may reside and execute on the same computer. For example, in some embodiments, a client 130 such as a data agent 195, or a storage manager 105, coordinates and directs local archiving, migration, and retrieval application functions as further described in the previously-referenced U.S. patent application Ser. No. 09/610,738. This client 130 can function independently or together with other similar clients 130.

As shown in FIG. 1, each secondary storage computing device 165 has its own associated metabase 161. Each client 130 may also have its own associated metabase 170 that may provide a fast and efficient mechanism for locating data, since other system components may simply consult the metabase for information rather than iteratively accessing and analyzing each data object associated with the client 130 (e.g., data objects stored in data store 160/162). However in some embodiments, each "tier" of storage, such as primary storage, secondary storage, tertiary storage, etc., may have multiple metabases or a centralized metabase, as described herein. For example, rather than a separate metabase or index associated with each client 130 in FIG. 1, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 105 or other management module may keep track of certain information that allows the storage manager 105 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 130, and can contain either all of the data of the clients 130 or a designated subset thereof. As depicted in FIG. 1, the data store 162 includes two sub-clients. For example, an administrator (or other user with the appropriate permissions; the term administrator is used herein for brevity) may find it preferable to separate email data from financial data using two different sub-clients having different storage preferences, retention criteria, etc.

Referring to FIG. 2, a block diagram illustrating an example of components of a server used in data storage operations is shown. A server, such as storage manager 105, may communicate with clients 130 to determine data to be copied to storage media. As described above, the storage manager 105 may contain a jobs agent 120, a management agent 131, a database 111, a stream agent 210, an interface agent 125, and/or other agents 220. Jobs agent 120 may manage and control the scheduling of jobs (such as copying data files) from clients 130 to storage devices 115. Management agent 131 may control the overall functionality and processes of the data storage system, or may communicate with global managers. Database 111 or another data structure may store storage policies, schedule policies, retention policies, or other information, such as historical storage statistics, storage trend statistics, and so on. Interface agent 124 may interact with a user interface, enabling the system to present information to administrators and receive feedback or other input from the administrators or with other components of the system (such as via APIs). The other agents 220 may perform additional functions.

Referring to FIG. 3, a block diagram illustrating components of a data stream 310 that may be utilized by a data storage system is shown. The stream 310 may originate from a client 130, continue (as indicated by reference character 320) to a media agent 165 and then (as indicated by reference character 330) to a secondary storage device 115. For example, in storage operations, the system may store, receive and/or prepare data to be stored, copied or backed up at a server or client 130. The system may then transfer the data to be stored to media agent 165, which may then refer to storage policies, schedule policies, and/retention policies (and other policies) to choose a secondary storage device 115. The media agent 165 may include a snapshot agent and an index agent (although these agents may also be separate components). The secondary storage device 115 receives the data from the media agent 165 and stores the data as a secondary copy. Secondary storage devices may be magnetic tapes, optical disks, USB and other similar media, disk and tape drives, and so on. Of course, the data storage system may employ other configurations of stream components not shown in FIG. 3.

Processes for Building Metabases

FIG. 4 depicts a flow chart illustrating a process 400 for building a metabase. The process 400 may be performed by data agent 195. Metabase information generated by process 400 may be stored within or copied to various metabases or data structures within the system, including metabase 170, secondary storage computing device index 161, and/or other centralized or distributed metabases.

In some implementations, the generated metabase may be represented by a table wherein each row corresponds to a file or data object accessible by a client's file system. The metabase may have at most one row for each file or data object accessible by the file system. The columns or fields for each row in the metabase table may include fields such as FRN, PFRN, the most recent USN relating to the file that is reflected in the metabase table, creation time, last modified time, last accessed time, data object size, low and/or high data object size, short file name, location or full path, a user or owner identifier, metatags, and/or other attributes of the data object.

The process 400 begins at step 402, where data agent 195 generates and populates an initial change table. Each row in an initial change table corresponds to a particular change record notified or created by the monitor agent. The initial change table may comprise columns or data fields such as USN, FRN, PFRN, and change codes. The initial change table may also comprise additional fields such as those described previously with respect to a metabase table. Additionally, data agent 195 may associate an initial change table with a start USN and an end USN (the lowest and highest USNs that appear in the table). To populate an initial change table, a data agent 195 may request an initial set of change records present in the change journal database at the time of the request or shortly thereafter. Data agent 195 may utilize an API to request and receive this set of change records from the monitor agent. Furthermore, at step 402, data agent 195 may request and receive, via a file system API, additional metadata from the file system regarding one or more data objects that are the subject of a received change record. Using the received information from one or both of these sources, data agent 195 may populate an initial change table.

At step 404, data agent 195 substantially simultaneously (1) populates a metabase by scanning or traversing a client file system and (2) populates interim change tables. Each row in an interim change table corresponds to a particular change record created by a monitor agent. An interim change table may have columns or fields similar to those of an initial change table described previously. In some implementations, an interim change table may instead have fewer, additional, or different data fields. A data agent 195 may associate an interim change table with a start USN and an end USN (the lowest and highest USNs that appear in the table).

Populating a metabase by scanning or traversing a large volume on a client's file system (or another portion of a client's file system) may take a significant amount of time. Additionally, applicable system conditions and user-provided settings may mandate that a data agent 195 go from being "online" to being "offline," which may mean that the data agent pauses or stops its traversal or other processing functions. Pauses may further add to the total time required for a file system traversal. For example, a data agent 195 may go offline if a client is powered off, if there is heavy processing or network load on the client, or during certain scheduled times defined by a user (e.g., daytime hours). To reduce the strain on a client's file system, it is desirable that when a data agent 195 is restarted (i.e., when the data agent is online performing a file system traversal, goes temporarily offline, and then comes back online), it may simply resume its traversal of the file system from approximately the same point in the file system without having to re-scan significant portions of the file system. Thus, the system may flag a location in the table when the scan stopped, so that the scan can resume from that point (as based on, e.g., one of the identifiers noted above, such as USN).

If data interactions occur on a client 130 during a file system scan, some of the metadata acquired during the scan may be inaccurate by the end of the scan. For example, if a data agent 195 traverses a specific file early in a scan (e.g., acquires and stores metadata reflecting its last modified time) and the file is modified by a user during a later part of the scan, the stored metadata for that file will be inaccurate. Change records generated by a monitor agent and stored in a change journal database provide some indication of metadata changes that may have occurred during a scan. However, if a change journal database has a finite change journal cache size, then for long scan times and/or high change rates, some relevant change records created during a scan may be pushed from the change journal database in favor of change records reflecting more recent data interactions. Thus the change journal database alone may be insufficient to accurately update metadata acquired during a scan. To improve the accuracy of the metabase, at step 404, during a file system scan, a data agent 195 uses interim tables that reflect many of the change records created during the execution of a file system scan.

FIG. 5 is a flow diagram illustrating a process 500 for scanning a client file system and populating interim change tables in a substantially simultaneous fashion. The process 500 may permit a data agent 195 to restart at various points. A data agent 195 may utilize process 500 to perform some or all of step 404 in process 400.

As shown at step 552, the process 500 begins when a data agent 195 comes online, such as when system conditions or other conditions permit the data agent to actively perform its metabase generation functions. At step 554, data agent determines the USN associated with the last change record in the change journal database by querying the monitor agent. The process 500 then bifurcates into two parallel subprocesses: a scanning subprocess, comprising steps 556, 558, 560, 562 and 580; and a change logging subprocess, comprising steps 564, 566, 568, 570, 572, 574, 576 and 578.

The change logging subprocess begins at step 564, where data agent 195 may create a new interim change table. Data agent 195 may not create a new interim change table at step 564 under certain conditions. For example, it may continue using a prior interim change table if the data agent has just come online from a short pause and/or the last change record in the change journal database was already reflected in a prior interim change table.

At step 566, data agent 195 may register with a change notification service to receive change notifications. At step 568, data agent 195 listens or otherwise waits for a new change notification. When data agent receives a new change notification at step 570, the notification may reflect change record information such as a USN, an FRN and a change code and/or other change record or metabase information.

At step 572, using the received information (e.g., an FRN), data agent 195 may utilize a file system API to query for additional metadata related to the data object that was the subject of the received change notification. For example, data agent 195 may utilize a received FRN to query a file system for the data object size of the file having that FRN. In some implementations, step 572 may additionally or alternatively be performed in conjunction with an update step 408 described subsequently. In such implementations, data agent 195 may only perform a query for each unique FRN appearing in interim change tables, instead of performing a query for each row in interim change tables.

The change logging subprocess then proceeds to step 574, where data agent 195 updates the new interim change table with received change notification information and related metadata. Alternatively, in some implementations, data agent 195 may immediately parse and/or process these and update a metabase to reflect the received change notification information and/or attributes. For example, data agent 195 may immediately determine if there is an existing entry in a metabase having the same FRN, and if so, it may update the metadata associated with that FRN in the metabase. Additionally, at step 574, data agent 195 may update the start USN and/or end USN associated with the new interim change table to reflect the most recently received USN.

The change logging subprocess then proceeds to decision block 576, where data agent 195 determines whether the traversal is complete, i.e., all files accessible by a file system or located in a particular volume or portion of a file system have been scanned. If the traversal is complete at decision block 576, the process 500 returns (or may return to block 568). Otherwise, the change logging subprocess proceeds to decision block 578, where data agent 195 determines whether it is still online. If data agent 195 is still online, the change logging subprocess repeats starting from step 568. If data agent 195 is no longer online, the subprocess pauses and resumes at step 552 only when the data agent comes back online.

The scanning subprocess begins at step 556, where data agent 195 traverses the next file or object in a client file system and requests metadata related to the next file. Data agent 195 may utilize a file system API and/or other information to determine which is the next file or object in the file system structure. Alternatively, data agent may utilize stored information about the file system to determine which file to traverse next. If no file has yet been traversed, the data agent 195 may utilize a file system API to instead determine a logical starting point within a file system and/or may start from a pre-determined or pre-configured starting point.

During step 556, data agent 195 utilizes a file system API to request and receive metadata that is related to the next file. Data agent may request metadata that corresponds to the fields utilized by a metabase table. For example, data agent 195 may request the last modified time and data object size of the next file. At step 558, data agent 195 records received metadata in a metabase.

The scanning subprocess then proceeds to decision block 560, where data agent 195 determines whether the traversal of a file system (or a volume or portion therein) is complete. If the traversal is complete at decision block 560, the process proceeds to step 580, where the scanning subprocess waits for the change logging subprocess to make any necessary updates to interim change tables, and then the process 500 returns. Otherwise, the scanning subprocess proceeds to decision block 562, where data agent 195 determines whether it is still online. If data agent is online, the scanning subprocess repeats starting from step 556. If data agent 195 is no longer online at decision block 562, the scanning subprocess pauses and resumes at step 552 only when it comes back online.

Referring again to FIG. 4, the process 400 continues to step 406, where data agent 195 identifies gaps in interim change tables and fills the identified gaps. As described previously, during the process 500 of FIG. 5, a change logging subprocess may be restarted repeatedly at step 552 after a pause in the data agent's processing. While the change logging subprocess is paused, waiting for the data agent 195 to come back online, a monitor agent may detect additional data interactions and create new change records, each with an additionally incremented USN. Since data agent 195 is offline during the creation of these new change records, data agent may not receive related change notifications reflecting them. When data agent eventually does come back online and creates a new table at step 564, there may be a gap between the last USN associated with the last interim change table and the starting USN associated with the new interim change table. That is, there will be a gap in the USNs recorded in the various interim tables. Data agent 195 may utilize these missing USNs or other related information to request that a monitor agent and/or file system supply change record information and/or metadata that is missing from the interim tables. Data agent 195 may add or store the missing change record information and/or metadata in an interim table and/or directly parse and analyze these in order to update a metabase directly.

In some implementations, the gap identification and filling step 406 may occur after the conclusion of step 404, that is, after all interim tables have been built. Alternatively or additionally, after every restart of data agent 195 at step 552, data agent 195 may attempt to identify and fill any gap created by the last pause.

The process 400 proceeds to step 408, where data agent 195 updates a metabase with information from initial and interim change tables. If step 572 was not performed during the process 500 of FIG. 5, during step 408, data agent may query a file system for metadata related to the various files that are the subject of the change table entries. In such implementations, data agent 195 may perform a query only for each unique FRN appearing in the initial and interim change tables, instead of performing a query for each row in the change tables, and thereby identify missing data and to fill in the table.

At step 408, data agent 195 may parse and analyze each of the entries in the initial and interim change tables to determine whether an entry indicates that some related metadata stored in a metabase is inaccurate. To make this determination, data agent 195 may analyze change codes stored in the change table entries. Alternatively or additionally, data agent may compare metadata stored in the metabase against metadata stored in the change tables. If data agent determines that a table entry indicates an inaccuracy in the metabase, data agent may update the metabase with accurate metadata stored in the change tables or may request accurate metadata from a file system and store this in the metabase.

In some implementations, data agent may parse change table entries in reverse chronological order; that is, it may process more recent change record notifications first (e.g., change record notifications having higher USNs). As data agent 195 parses each change table entry and updates a metabase, data agent 195 may update a field in the metabase indicating the most recent USN processed for a given file (i.e., for a given FRN). In some implementations, data agent 195 may not attempt to parse and analyze an entry in a change table having a particular FRN and a first USN if a metabase entry for that same FRN shows data agent has processed a more recent USN for the same file.

After the conclusion of step 408, at steps 410 and 412, data agent may periodically perform updates of the generated metabase by (1) listening for additional change notifications and/or retrieving new change records from a change journal database and (2) updating a metabase to reflect these new change records and/or notifications. In some implementations, at step 410, data agent may listen for additional change notifications and/or retrieve new change records from a change journal database in substantially the same fashion as described with respect to the change logging subprocess of FIG. 5 and gap-filling step 406. In some implementations, at step 412, data agent may update a metabase in substantially the same fashion described with respect to step 408.

CONCLUSION

From the foregoing, it will be appreciated that specific examples of data storage systems have been described herein for purposes of illustration, but that various modifications may be made without deviating from the spirit and scope of the system. For example, although files may have been described herein, other types of content such as user settings, application data, emails, and other data objects (for example, blocks of data) can be imaged by snapshots. Accordingly, the system is not limited except as by the appended claims.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

If a synchronization process or synchronization processes are described herein, it is not intended to require that multiple synchronizations occur simultaneously or that multiple computing systems being synchronized each receive the same data. Although in some examples the data can be broadcast to all participating computing systems simultaneously (or close to simultaneously), in other examples the data can be sent to different computing systems or groups of computing systems at different times. Likewise, in some examples the same data, or the same subset of the data can be sent to all computing systems. However, in other examples, subsets of the data can be tailored for a given computing system or group of computing systems.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. As another example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the inventors reserve the right to add additional claims after filing the application to pursue such additional claim forms for other aspects of the invention.

I claim:

1. A method, performed on a server computer, for generating a database of metadata that describes data objects, the method comprising:
   interfacing with a file system associated with data stored on a storage device,
      wherein the file system provides access to data objects and metadata included within the data stored on the storage device, and
      wherein the file system is located on a client computer, external to, but communicatively coupled to, the server computer;
      wherein the interfacing includes:
         requesting metadata related to the data objects;
         receiving the requested metadata; and
         storing the received metadata within the database of metadata; and
   populating one or more data structures, wherein populating one or more data structures includes—
      registering, on the client computer, to receive change notifications from a change notification service;
      receiving a change notification from the change notification service of the client computer,
         wherein the change notification includes information regarding an interaction with a data object; and
      updating the one or more data structures to include information provided by the received change notification,
         wherein populating the one or more data structures occurs during substantially the same time as interfacing with the file system located on the client computer.

2. The method of claim 1, further comprising performing the following for each of the data objects stored on the storage device:
   requesting that the file system provide metadata related to each of the data objects;
   receiving the requested metadata; and
   storing the received metadata in the database of metadata.

3. The method of claim 1, wherein the file system of the client computer includes a change journal, and wherein the change journal provides the change notifications.

4. The method of claim 1, wherein received change notifications created outside of a required time reflect interactions with data objects that occur after interfacing with the file system.

5. The method of claim 1, further comprising examining the one or more data structures to determine if any received change notifications were received outside of a required time.

6. A non-transitory computer-readable medium having instructions to cause at least one processor to generate a database of metadata that describes data objects, comprising:
  interfacing with a file system associated with data stored on a storage device,
    wherein the file system provides access to data objects and metadata included within the data stored on the storage device,
    wherein the file system is located on a client computer, external to, but communicatively coupled to, the server computer, and
    wherein the interfacing includes:
      requesting metadata related to the data objects;
      receiving the requested metadata; and
      storing the received metadata within the database of metadata; and,
  populating one or more data structures, wherein populating one or more data structures includes—
    registering for a change notification service;
    receiving a change notification, wherein the change notification includes information regarding an interaction with a data object; and
    updating the one or more data structures to include information provided by the received change notification,
    wherein populating the one or more data structures occurs during substantially the same time as interfacing with the file system.

7. The computer-readable medium of claim 6, further comprising performing the following for each of the data objects stored on the storage device:
  requesting that the file system provide metadata related to each of the data objects;
  receiving the requested metadata; and
  storing the received metadata in the database of metadata.

8. The computer-readable medium of claim 6, wherein the file system of the client computer includes a change journal, and wherein the change journal provides the change notifications.

9. The computer-readable medium of claim 6, further comprising examining the one or more data structures to determine if any received change notifications were received outside of a required time.

10. One or more non-transitory computer-readable data storage media storing instructions that, when executed by a computer, perform a method for generating a database of metadata for data files stored on a data storage device, the method comprising:
  scanning a file system associated with the data storage device, wherein the file system indexes the data files stored on the data storage device;
  storing information in a data structure, wherein the information relates to interactions with the data files stored on the data storage device;
  identifying interactions with the data files stored on the data storage device that are not reflected by the information stored in the data structure;
  updating the data structure with information regarding interactions with the data files stored on the data storage device that are not reflected by the information stored in the data structure; and
  based on the information stored in the data structure, updating metadata in a database of metadata.

11. The computer-readable media of claim 10, further comprising populating the database of metadata substantially simultaneously while the storing the information in the data structure.

12. The computer-readable media of claim 10, wherein the data interactions that are not reflected by the information stored in the one or more data structures include interactions with data objects that have occurred after beginning the scanning of the file system.

13. A system for generating a database of metadata that describes data objects, the system comprising:
  at least one processor;
  at least one memory coupled to the processor;
  a scanning unit configured to scan a file system associated with a computing device to obtain information, wherein the file system provides access to data stored on a data storage device;
  a populating unit configured to populate a database of metadata with the obtained information;
  a storing unit configured to store information in one or more data structures, wherein the stored information relates to data interactions with the data stored on the data storage device;
  an identifying unit configured to identify data interactions that are not reflected by the information stored in the one or more data structures;
  a first updating unit configured to update the one or more data structures with information regarding interactions with data stored on the data storage device that are not reflected by the information stored in the one or more data structures;
  an accessing unit configured to access the information stored in the one or more data structures; and
  a second updating unit configured to update metadata in the database of metadata based on the accessed information.

14. The system of claim 13, wherein the means for populating unit populates the database of metadata substantially simultaneously while the storing unit stores information in the one or more data structures.

15. The system of claim 13, wherein the data interactions that are not reflected by the information stored in the one or more data structures include interactions with data objects that have occurred since the scanning unit begins scanning the file system.

* * * * *

UNITED STATES PATENT AND TRADEMARK OFFICE
CERTIFICATE OF CORRECTION

PATENT NO. : 9,047,296 B2  
APPLICATION NO. : 13/894010  
DATED : June 2, 2015  
INVENTOR(S) : Rahul S. Pawar It is certified that error appears in the above-identified patent and that said Letters Patent is hereby corrected as shown below:

Specification

In column 10, lines 31-32, delete "OPERATIONS;" and insert -- OPERATIONS); --, therefor.

In column 10, lines 34, delete "MANAGEMENT;" and insert -- MANAGEMENT); --, therefor.

In column 10, lines 37, delete "MANAGEMENT," and insert -- MANAGEMENT), --, therefor.

In column 10, lines 39, delete "INFORMATION;" and insert -- INFORMATION); --, therefor.

In column 10, lines 42, delete "COPIES;" and insert -- COPIES); --, therefor.

In column 10, lines 44, delete "DATA;" and insert -- DATA); --, therefor.

In column 10, lines 46, delete "INSTANCING," and insert -- INSTANCING), --, therefor.

In column 10, lines 57, delete "OBJECTS." and insert -- OBJECTS). --, therefor.

Claims

In column 20, line 44, in claim 14, delete "the means for" and insert -- the --, therefor.

Signed and Sealed this  
First Day of December, 2015

Michelle K. Lee  
*Director of the United States Patent and Trademark Office*